Sept. 22, 1953  W. E. TEMPLETON  2,653,028
APPARATUS FOR SPREADING MANURE
Filed Nov. 24, 1950  4 Sheets-Sheet 1
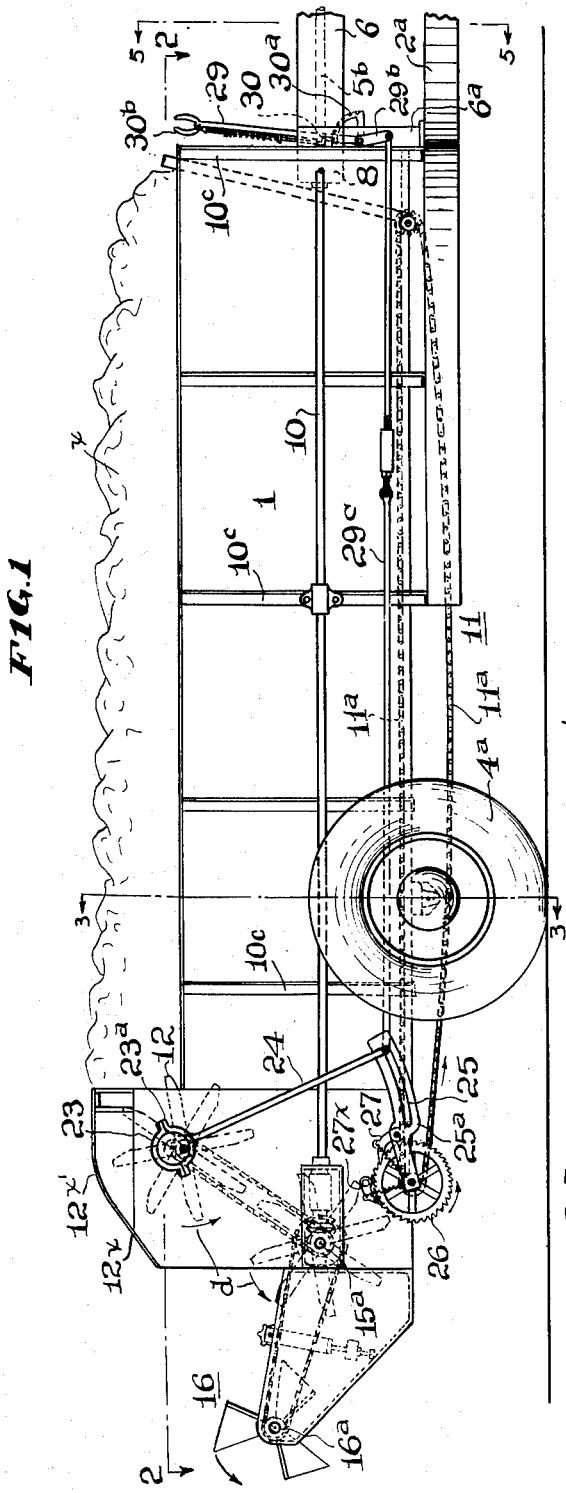
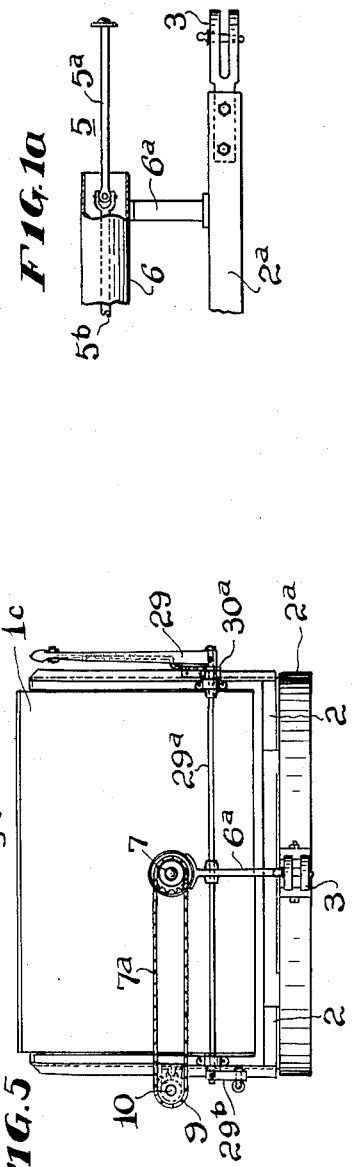
INVENTOR.
WILLIAM E. TEMPLETON
BY
Geo. B. Pitts
ATTORNEY

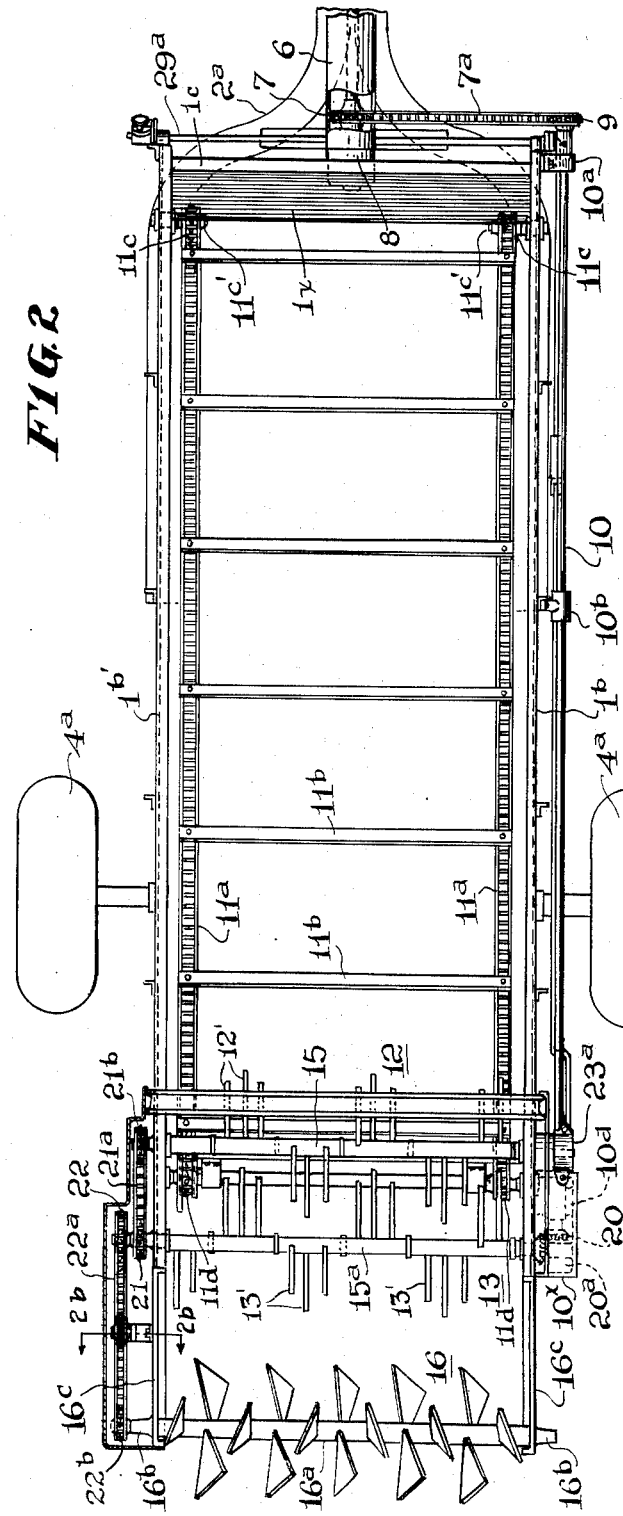

Sept. 22, 1953  W. E. TEMPLETON  2,653,028
APPARATUS FOR SPREADING MANURE
Filed Nov. 24, 1950  4 Sheets-Sheet 3

INVENTOR.
WILLIAM E. TEMPLETON
BY
ATTORNEY

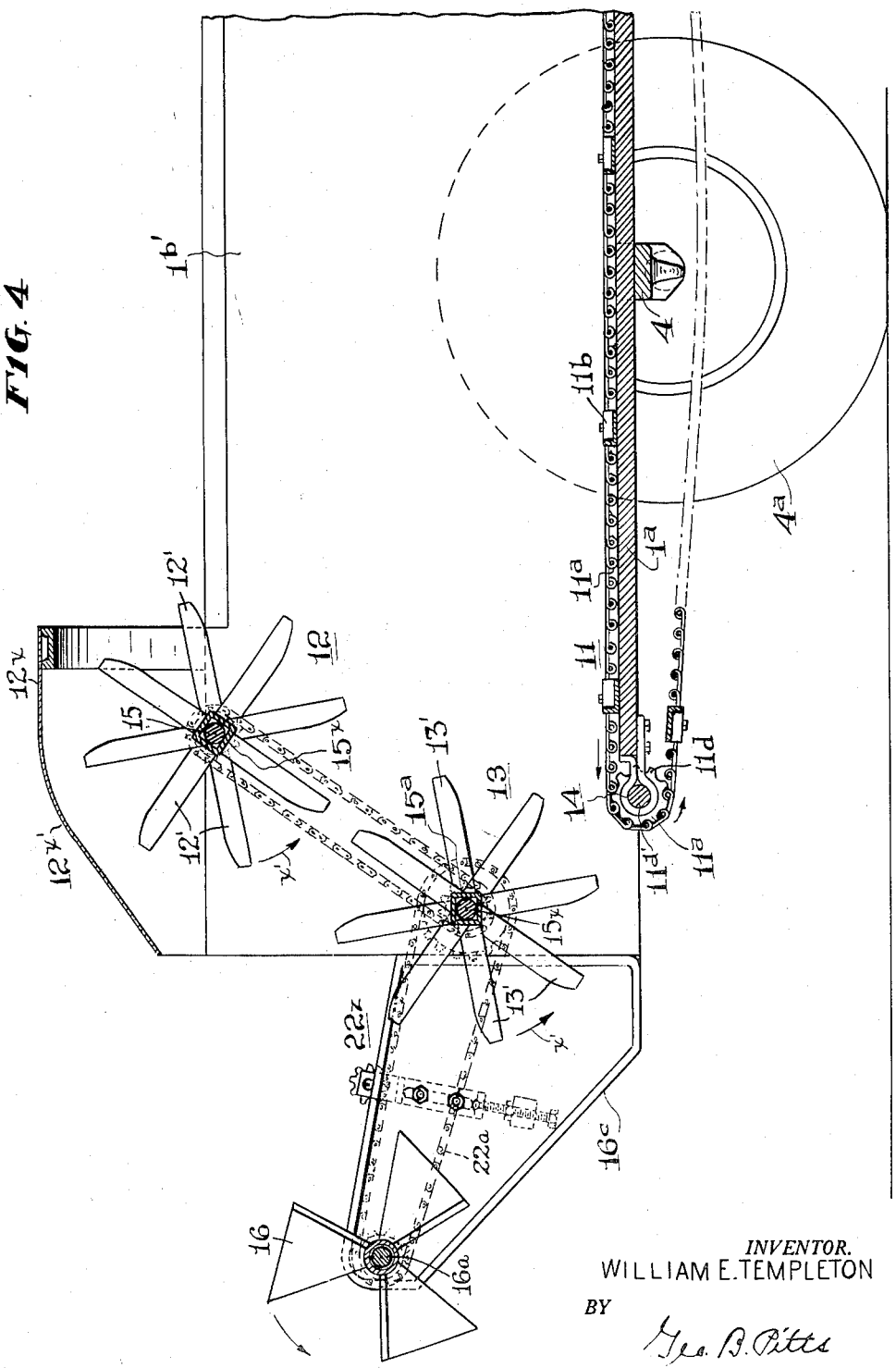

Patented Sept. 22, 1953

2,653,028

UNITED STATES PATENT OFFICE 2,653,028

APPARATUS FOR SPREADING MANURE

William E. Templeton, Lexington, Ohio

Application November 24, 1950, Serial No. 197,324

2 Claims. (Cl. 275—3)

This invention relates to apparatus for spreading soil treating material over an area in a rapid and economical manner. The apparatus includes mechanism particularly adapted for spreading manure, whereby the latter, during feeding thereof, is conditioned into substantially pulverized form and fed to the spreading elements or members and the latter in turn deliver or discharge the manure to the surface to be covered throughout the width of the path traversed by the apparatus and areas adjacent thereto.

The manure, as supplied to the apparatus, consists of a mixture of droppings and hay or straw or other fibrous materials disposed in separate and intermixed masses or lumps which have to be disintegrated into a condition or state which permits the delivery or discharge of the manure by the spreading elements, so that a layer of the manure may be spread uniformly on the soil or surface to be fertilized in the form of a layer, whereby treatment of the area to be fertilized uniformly and without waste of the manure results.

The apparatus may be incorporated in a tractor type of vehicle but by preference, as shown herein, it is removably attached to and drawn by a tractor.

The apparatus includes means for cutting or disintegrating the manure while feeding it to the spreading elements, whereby lumps and masses are reduced to a substantially uniformly pulverized condition and delivered to the spreading elements, so that the latter may effect a discharge of the manure in a uniform manner throughout the width of the path traversed by the apparatus.

The apparatus includes a body adapted to hold a large quantity of manure and having (a) at one end means for connection to the tractor and adjacent its opposite end suitable supporting wheels and (b) an endless conveyor the upper run of which is supported on and moves along the bottom of the body to feed the manure to the conditioning devices at selected speeds coordinated to the speed of the tractor, whereby a layer of the manure of suitable thickness and in desired quantities may be spread on the soil or surface during translation of the apparatus.

One object of the invention is to provide an improved mechanism having sets of revoluble spreading elements and correlated sets of devices arranged to condition the manure into a substantially pulverized state and deliver it to the spreading elements.

Another object of the invention is to provide an improved apparatus for spreading manure wherein is provided a plurality of devices, certain of which are revolubly driven and disposed in a predetermined co-acting relation to effect a conditioning of the manure while feeding it outwardly for discharge on the soil or surface to be treated.

Another object of the invention is to provide an improved apparatus of this type having sets of revoluble devices adapted to simultaneously feed and disintegrate masses or lumps of the manure into substantially pulverized condition, so that all portions of the manure may be spread substantially uniformly on the surface to be treated or fertilized.

Another object of the invention is to provide an improved apparatus of this type having sets of radially disposed driven devices, to which the manure is fed, for disintegration, the devices being of a rectilinear shape, whereby the centrifugal forces incident to the revolving movement thereof serve to prevent adhesion or accumulation of manure and/or straw or other material on the devices.

Other objects of the invention will be apparent to those skilled in the art to which my invention relates from the following description taken in connection with the accompanying drawings, wherein Figs. 1 and 1a, taken together, show a side elevation of an apparatus embodying my invention, parts being broken away, the tractor or other type of propelling vehicle being omitted;

Fig. 1b is a fragmentary side elevation of parts shown in Fig. 1, somewhat enlarged;

Figs. 2 and 2a show a plan view of the parts shown in Figs. 1 and 1a;

Fig. 2b is a section on the line 2b—2b of Fig. 2.

Fig. 4 is a fragmentary section on the line 4—4 of Fig. 3; and

Fig. 5 is a front elevation substantially on the line 5—5 of Fig. 1.

Figure 3:
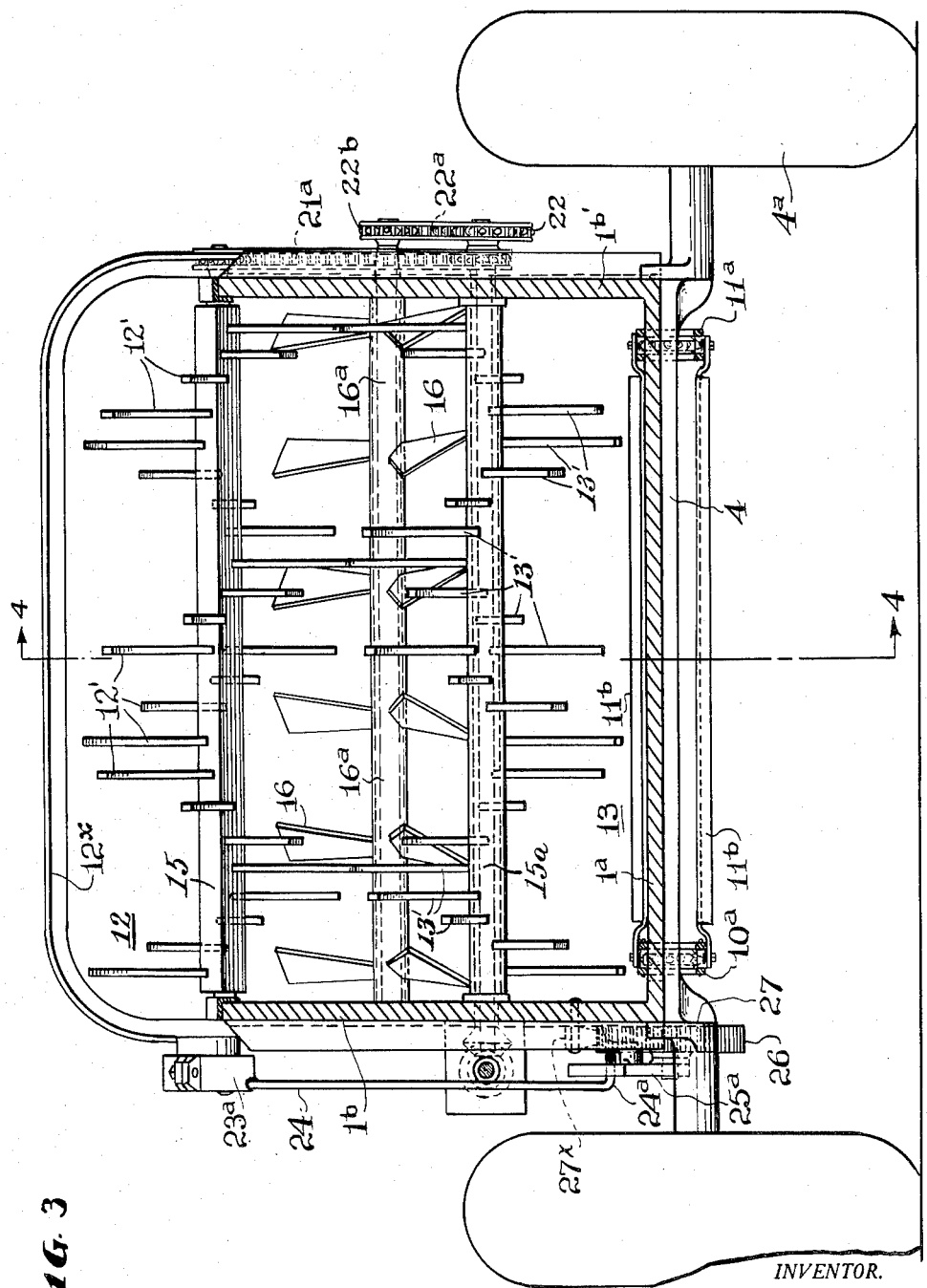
Fig. 3 is a section on the line 3—3 of Fig. 1, enlarged.

In the drawings, 1 indicates as an entirety an elongated body of a size to hold a large quantity of manure, as shown at x. The body 1 consists of a bottom 1a, side walls 1b, 1b', and a front wall 1c. The front or inner end portion of the bottom 1a is suitably secured to sills 2, which in turn are mounted on a frame 2a. The frame 2a extends outwardly, as shown at 2b, and terminates in a hitching device 3 of any suitable construction, whereby the frame 2a may be detachably connected to a tractor or other self-propelled vehicle. 4 indicates an axle suitably secured to the bottom 1a inwardly of its outer end, the opposite ends of the axle terminating in spindles for wheels 4a.

5 indicates a driving connection adapted to be detachably connected to the power take-off of the tractor, consisting of an outer shaft section 5a drivingly connected by a universal joint to an inner shaft section 5b. The shaft sections 5a, 5b, extend through a tubular guard or enclosure 6 suitably supported by a standard 6a fixed to the frame 2a. The inner end portion of the shaft section 5b is connected to the hub of a sprocket 7 and extends through the latter for connection to one element of a suitable slip clutch 8. The slip clutch 8 serves as a safety device in the event any member or element of the driving mechanisms or driven parts break or are prevented from operating.

The clutch 8 is fixedly mounted in an opening formed in the front wall 1c. The sprocket 7 is engaged by an endless sprocket chain 7a which engages with and drives a sprocket 9. The sprocket 9 is fixed to the inner end of a shaft 10 which extends along and exteriorly of the side 1b of the body 1 and provides power for the mechanisms later referred to. The shaft 10 is mounted in spaced bearings provided in fittings 10a, 10b (two being shown), which are fixed to studdings 10c on the adjacent side 1b of the body 1, and a hanger 10d mounted in a housing 10x.

11 indicates as an entirety an endless conveyor for feeding the manure to a plurality of combined feeding and conditioning devices, indicated as entireties at 12, 12x, 13, respectively. The conveyor 11 consists of spaced endless chains 11a connected together by uniformly spaced, transversely disposed manure engaging devices 11b, each preferably consisting of an angle and suitably connected at its opposite ends to alined links of the chains 11a. The chains 11a reeve about inner and outer pairs of sprockets 11c, 11d, the sprockets 11c being rotatably mounted on transversely disposed stud shafts 11c' mounted in the side walls 1b, 1b', adjacent the front or inner end of the bottom 1a and the sprockets 11d being fixed to the opposite ends of a transverse shaft 11d' disposed at the outer or rear end of the bottom 1a. The shaft 11d' is mounted in suitable bearings provided in hangers 14. The shaft 11d' is intermittently driven in the manner later set forth. As shown in Figs. 1, 2 and 4, the shafts 11c', 11d', are supported in a plane below the upper surface of the bottom 1a, in which arrangement the upper run of the conveyor 11 is supported on and slides endwise of the bottom 1a from its inner end to its outer end (as indicated by the arrows) and the lower run returns below the bottom. As shown in Fig. 2, the width of the conveyor 11 approximates the area of the bottom 1a between the body sides 1b, 1b', so that the engaging devices 11b engage and feed outwardly the entire body of the manure supplied to the body 1. 1x indicates a wall suitably disposed between and secured along its opposite ends to the sides 1b, 1b', and inclined downwardly and outwardly, its lower end terminating in close relation to the inner end of the bottom 1a, so that all of the manure supplied to the body 1 will be in position for engagement by the conveyor 11.

The body sides 1b, 1b', adjacent their outer ends, are provided with upper and lower pairs of alined bearings through which shafts 15, 15a, extend, respectively, the device 12 being mounted on the shaft 15 and the device 13 being mounted on the shaft 15a. The shafts 15, 15a, are driven at the same speed counter-clockwise (as viewed in Figs. 1 and 4) in the manner later set forth.

The device 12 comprises a plurality of blades 12' rigidly secured to and projecting radially from the shaft 15 in one or more helical formations or rows about the axis of said shaft, two such formations in axially adjoining relation on the shaft being here shown. The blades of each helical formation are substantially equidistantly spaced from one another both axially and circumferentially of the shaft, and each blade is of a length, for example from three to eight inches, which is a plurality of times greater than the diameter of the shaft 15. When more than one helical blade formation is employed the blades of axially adjoining formations preferably are arranged to wind in opposite directions; in other words, as viewed in Fig. 3, the blades 12' on the left-hand half of the shaft 15 wind in a direction to constitute a left-hand helix while the blades on the other half of said shaft are arranged to constitute a right-hand helix. As here shown, each helical formation makes approximately one and one-half turns about the shaft, and the one formation is offset circumferentially of the shaft substantially 180° from the other.

The blades 13' of the device 13 are of a length similar to that of the blades 12' and are arranged on their shaft 15a in helical sets or formations similar to those of said blades 12' as regards circumferential and axial spacing of the several blades; and since the shafts 15 and 15a rotate in the same direction, each helical formation of blades 13' winds in the same direction as the adjacent or complementary set of blades 12' in order that successive pairs of blades 12' and 13' may mate or assume a conjunctive relation as the shafts are rotated. That is to say, each blade 13' is alined, longitudinally of the machine, with a companion blade 12' and the several blade formations are so arranged circumferentially of their respective shafts that in conjunction with the like direction of winding of the adjacent or complemental sets on the two shafts, once during each revolution of said shafts each such longitudinally alined pair of blades assumes a conjunctive radially alined position, as shown in Fig. 4. The length of the blades is such in relation to the spacing of the axes of the shafts 15 and 15a that when the pairs of blades are in this conjunctive relation the ends of the blades are appreciably spaced from one another, as will be clear from this figure.

The device 12x consists of a tranverse wall having sides at its opposite ends suitably supported on the body sides 1b, 1b'. The wall 12x extends from a point inwardly of the device 12 to a point outwardly thereof, and serves to guide the conditioned material to a plurality of spreading elements 16, which are later referred to. The intermediate section 12x' thereof (in a direction longitudinally of the body 1) is of arcuate shape concentric to the orbit of the tips or outer ends of the blades 12', to co-act therewith to supplement the disintegration of the manure by the blades 12', 13', as the latter revolve. The arcuate section 12x' is preferably spaced from the orbit of the tips of the blades 12' approximately a distance equal to the spacing of the tips of the blades 12', 13', when the latter are in co-acting relation, as later set forth. In apparatus built by me, the outer ends of the blades, when in conjunctive relation, are spaced approximately two inches. As shown in Figs. 2, 3 and 4, the blades 12', 13', are flat and relatively thin and of rectilinear shape, whereby their terminating ends serve to cut and effect a disintegration of the masses of the manure as later set forth. As will be observed, the blades 12', 13', revolve counter-clockwise at the same speed (as later set forth) and co-act in the aforesaid planes, respectively, as indicated by the arrows $x'$, $x'$, so that successive blades 12' in each row on the shaft 15 progressively co-act with the corresponding successive blades 13' in the adjacent row on the shaft 15a to effect a disintegrating co-action between them as they revolve. By preference, the shaft 15 is disposed in a vertical plane forwardly of the shaft 15a. In this arrangement, the blades 13' serve to raise the manure and direct it into the path of the blades 12', whereby both sets of blades and wall 12x function to feed the manure outwardly to the spreading elements 16. Due to the shape of the blades and their alined spaced relation, when in co-acting position, and the co-action of the blades 12' and wall section 12x', those masses or lumps of the manure, which are larger than the spacing of the blade tips when in co-acting relation, and the spacing of the wall section 12x', are cut up and disintegrated into a substantially pulverized condition while simultaneously feeding outwardly the disintegrated and smaller portions of the manure, with the result that the entire body of the manure is in a condition which insures the spreading thereof on the soil or surface to be fertilized in the form of a layer the thickness of which may be controlled by the rapidity of the intermittent movement of the conveyor 11 in relation to the speed at which the tractor is driven.

Each shaft 15, 15a, preferably consists of an inner member the opposite ends of which are mounted in the bearings already referred to and an enclosure 15x fixed to and extending along that portion of the member disposed between the sides 1b, 1b'. The enclosures are preferably square shape in cross section to simplify the welding of the inner ends of the blades in position.

The spreading elements 16 consist of radially extending plates suitably fixed at their inner ends to a shaft 16a in uniformly spaced relation about the latter, each having diverging side edges to provide a wide surface at its outer end portion for engagement with the conditioned manure. The elements 16 at one side of an imaginary point intermediate the ends of the shaft 16a are inclined in one direction to discharge the manure outwardly and laterally, whereas the elements on the opposite side of the imaginary point are inclined in the opposite direction to discharge the manure outwardly and laterally, whereby the path traversed by the apparatus and the area along each side thereof is covered with a layer of manure. The shaft 16a is driven in a counter-clockwise direction as later set forth. The opposite ends of the shaft 16a are mounted in suitable bearings provided in hollow bosses 16b, which are welded on and adjacent the outer ends of spaced supports 16c. The supports 16c are suitably secured to the outer end portions of the body sides 1b, 1b', and extend outwardly therefrom to space the sets of spreading elements 16 from the sets of conditioning devices 12, 13.

The driving connections for the shafts 15, 15a and 16a are preferably arranged to rotate the shafts 15, 15a, at a high speed and the shaft 16a at a higher speed and consist of the following: The outer end of the shaft 10 is provided with a bevel gear 20 in mesh with a bevel gear 20a on the adjacent end of the shaft 15a to drive the latter. The opposite end of the shaft 15a extends through the side 1b' and is provided with inner and outer sprockets 21 and 22. The sprocket 21 is engaged by an endless chain 21a, which engages a sprocket 21b fixed to the adjacent end of the shaft 15 to drive the latter. The sprockets 21, 21b, have the same number of teeth, whereby the speed of the shaft 15 is driven at the same speed as that of the shaft 15a. The sprocket 22 is engaged by an endless chain 22a which engages a sprocket 22b on the adjacent end of the shaft 16a, the sprocket 22b having a lesser number of teeth as compared to the number of teeth on the sprocket 22, whereby the shaft 16a is driven at a speed greater than that of the shaft 15a.

The conveyor 11 is intermittently operated by the shaft 15, by the following mechanism wherein provision is made to adjust the length of travel of the conveyor 11 in each intermittent movement in co-ordinated relation thereof to any desired speed of the tractor; 23 indicates an eccentric mounted on that end of the shaft 15 adjacent the body side 1b and outwardly of the latter. The eccentric 23 revolves within a collar 23a to which the inner end of a link 24 is connected and endwise operated as the eccentric revolves. The outer end of the link 24 is provided with a lateral extension 24a fitting into an elongated slot 25 formed in the side wall of an elongated arm 25a. The inner end of the arm 25a is pivoted on the extended end of the shaft 11d' to oscillate thereabout due to the operation of the link 24. I provide a ratchet wheel 26 which is fixed to the shaft 11d' inwardly of the arm 25a. 27 indicates a dog pivotally mounted at one end on the arm 25a, its opposite end being arranged to engage the teeth of the ratchet wheel 26. In this arrangement, the extension 24a of the link 24, through its engagement with the side walls of the slot 25, serves to oscillate the arm 25a, so that in the downstroke of the link 24, the dog 27 moves clockwise relative to the ratchet wheel 26 and rides the adjacent teeth thereof, but in the upstroke of the link 24 the dog 27 engages a tooth on the wheel 26 and rotates the latter a predetermined angular distance the effect of which is to operate the conveyor 11, successive operations of the dog 27 in the manner set forth serving to provide an intermittent movement of the conveyor 11 and fed the manure in the body 1 outwardly. The dog 27 is connected to a spring 28, which yieldably maintains the dog in engagement with the ratchet wheel 26. As shown in Fig. 1, the extension 24a is disposed at the outer end of the slot 25, in which position of the extension the oscillations of the arm 25a are of minimum length and a corresponding limited travel in each intermittent movement of the conveyor 11 results. To increase the length of the oscillations of the arm 25a and a corresponding increase in the travel in each intermittent movement of the conveyor 11, the extension 24a is adjusted inwardly along the slot 25 to any selected position, whereby the distance of travel of the conveyor 11 in successive intermittent movements thereof and feed of the manure may be co-ordinated with the speed at which the tractor is to be driven during spreading of the manure. 27x indicates a separate dog pivotally mounted on a stud shaft supported on the side 1b. The dog engages the teeth on the ratchet wheel 26 and prevents movement thereof in a rearward direction, but rides the teeth when the wheel is being rotated by the dog 27. A spring 27x' connected at one end to the dog 27x and suitably anchored at its opposite end serves to bias the dog toward the ratchet teeth on the wheel 26. The adjusting mechanism for the extension 24a consists of the following: 29 indicates a manually operated lever preferably disposed adjacent the inner end of the body side 1b' and suitably fixed to one end of a rock shaft 29a. The shaft 29a is mounted in bearings which are shown supported on the front ends of the side walls 1b, 1b'. The opposite end of the shaft 29a is provided with an arm 29b, the outer end of which is pivotally connected to a rod 29c extending along and exteriorly of the body side 1b, the outer end of the rod being pivotally connected to the outer end of the extension 24a. As shown in Fig. 1, a trigger mechanism is associated with the lever 29, this mechanism including a dog 30 arranged to engage and disengage an arcuate ratchet 30a and a spring biased trigger 30b, connected to the dog 30 for disengaging it from the ratchet 30a when the lever 29 is to be operated. When the lever 29 is operated to adjust the extension 24a to the selected position, the trigger 30b is released to permit the dog 30 to engage the ratchet 30a, which locks the lever in operated position and secures the extension in adjusted position.

In operation, the entire body of manure supplied to the body 1 is intermittently fed outwardly into engagement with the revolving devices 12, 13, and into the space between the device 12 and the wall 12x, the blades 13' engage portions of the manure and carry such portions upwardly into engagement with the device 12 and outwardly for engagement with the spreading elements 16, whereas the device 12 engages other portions of the manure and carries such portions upwardly and outwardly relative to the wall 12x for engagement by the spreading elements 16 as shown by the arrows d, and simultaneously the blades 12', 13', and wall section 12x' co-act on the manure to reduce and disintegrate it into a substantially pulverized condition, so that as the body 1 is driven forwardly, a layer of the pulverized manure is spread on the soil or surface to be treated. By correlating the feed of the manure to the devices 12, 12x, 13, by the intermittent movements of the conveyor, in relation to the driving speed of the tractor, a layer of manure of a substantially predetermined thickness may be uniformly spread over the path traversed by the body 1 and areas along the opposite sides thereof, to insure an adequate and uniform treatment of the soil to be fertilized.

It will be observed that each of the blades 12', 13', extends radially and is devoid of lateral extensions and as the revolution of each set of blades establishes a centrifugal force on the manure while it is being disintegrated and fed outwardly by the blades 12', 13', accumulation of manure and/or straw on or around the blades is eliminated, so that the blades are automatically maintained free of accumulations thereon and therefore capable of functioning effectively.

22z indicates an adjustable take-up mechanism for the chain 22a.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A material shredding and spreading mechanism for use in load feeders including a material-carrying body having an open rear end, said mechanism comprising a pair of rotatably mounted vertically spaced parallel shafts disposed transversely of said body adjacent its said open end; means for driving said shafts in the same direction and at the same speed; a series of shredding blades secured to each of said shafts in helical formation about the axis thereof, said blades extending radially outward from each shaft a distance substantially greater than the diameter of such shaft, the successive blades of each helical formation being equidistantly spaced circumferentially of its shaft, the helical formations being so disposed on the respective shafts that once during each revolution of the shafts each blade on one shaft assumes a conjunctive radially alined position with a corresponding blade on the other shaft in which position the outer ends of such blades are in at least slightly spaced relation; a third shaft disposed transversely of the body rearwardly of the first mentioned shafts; a plurality of inclined spreading elements carried by said third shaft; and means for rotating such shaft and elements.

2. A material shredding and spreading mechanism for use in load feeders including a load-carrying body having an open rear end, said mechanism comprising a pair of rotatably mounted parallel shafts disposed transversely of said body adjacent its said open end, one of said shafts being positioned upwardly and forwardly of the other; means for driving said shafts in the same direction and at the same speed; a plurality of sets of shredding blades secured to and extending radially outward from each of said shafts, each such blade set being arranged in helical formation about the axis of its shaft with the axially adjoining helical formations on each shaft winding in opposite directions and the corresponding formations on the two shafts winding in the same direction, said blades being of a length equal to a plurality of times the diameter of their respective shafts and being equidistantly spaced circumferentially of such shafts with each blade of one shaft being alined longitudinally of the body with a corresponding blade of the other shaft, the several helical blade formations being so arranged on the respective shafts that once during each revolution of the shafts each of said longitudinally alined pair of blades assumes a conjunctive radially alined position in which the outer ends of such blades are substantially spaced from one another; a third shaft disposed transversely of the body rearwardly of the first mentioned shafts; sets of inclined spreading elements carried by said third shaft; and means for rotating such shaft and elements.

WILLIAM E. TEMPLETON.

References Cited in the file of this patent

UNITED STATES PATENTS

| Number | Name | Date |
|---|---|---|
| 1,328,618 | Cook | Jan. 20, 1920 |
| 1,868,337 | Storm | July 19, 1932 |
| 2,094,572 | Hendricks et al. | Sept. 28, 1937 |
| 2,239,448 | Selhorst | Apr. 22, 1941 |
| 2,256,815 | Raney et al. | Sept. 23, 1941 |
| 2,274,481 | Johnston | Feb. 24, 1942 |
| 2,342,837 | Brown | Feb. 29, 1944 |